Patented May 16, 1950

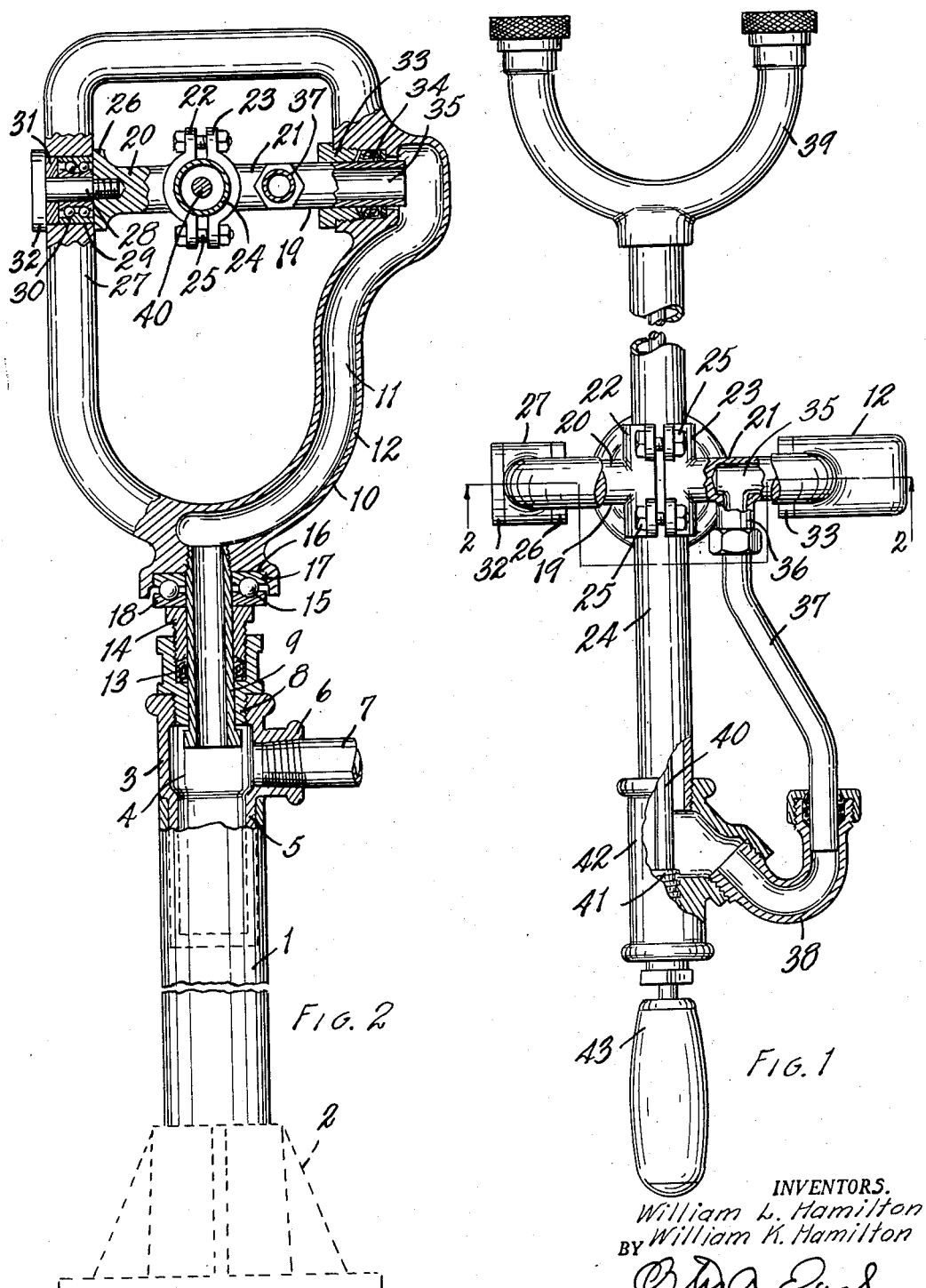

2,507,668

UNITED STATES PATENT OFFICE 2,507,668

SPRAYING APPARATUS SUPPORT

William L. Hamilton and William K. Hamilton, Bangor, Mich.

Application May 8, 1946, Serial No. 668,058

2 Claims. (Cl. 299—73)

This invention relates to improvements in spraying apparatus.

Spraying apparatuses such as commonly used for the spraying of fruit trees and the like are operated under high pressure with a result that a great deal of manual effort is required in manipulating the spray head.

The main objects of this invention are:

First, to provide a sprayer apparatus adapted for operating under high pressures in which the manual effort is minimized, at the same time the spray head may be variously manipulated to direct the spray.

Second, to provide a spraying apparatus having these advantages which may be easily installed on trucks or other equipment which is commonly provided with motors and pumps for maintaining the pressure.

Third, to provide an apparatus of this character which is simple and economical in its parts and capable of a wide range of adaptation.

Objects relating to details and economies of the invention will appear from the description to follow. The invention is defined and pointed out in the claims.

A preferred embodiment of the invention is illustrated in the accompanying drawing, in which:

Fig. 1 is a plan view partially in section of a sprayer embodying the features of the invention.

Fig. 2 is an enlarged fragmentary view partially in elevation and partially in section on line 2—2 of Fig. 1.

The embodiment of the invention illustrated comprises a standard 1 arranged in a suitable base 2 shown by dotted lines in Fig. 1 and adapted for mounting on the platform of a truck or other vehicle. This standard is desirably formed of a section of pipe. The supply coupling member 3 is provided with a chamber 4 and has a reduced lower portion 5 seated in the upper end of the standard.

The coupling member has a lateral nipple 6 receiving the supply pipe 7 which is ordinarily connected to the pressure tank. This supply pipe may desirably have a flexible section for convenience in attachment.

The coupling member 3 is provided with a bearing 8 for the shank 9 of the spray pipe supporting yoke 10. The spray pipe supporting yoke has a passage 11 in its arm 12 communicating with the tubular shank 9 and is therefore connected to the chamber 4 of the supply coupling. The bearing 8 is provided with a packing 13 and a gland 14.

The ball thrust bearing designated generally by the numeral 15 is arranged between the gland and the yoke 10, the yoke being provided with a downwardly facing seat 16 for the upper race member 17, the lower race member 18 being supported by the gland. This provides a free swivel mounting for the member 10.

The member 10 is provided with a cross bar designated generally by the numeral 19 and made up of sections 20 and 21 having complementary clamp members 22 and 23 respectively which are clamped upon the spray pipe 24 by means of bolts 25.

The section 20 has a flange 26 engaging the inner side of the yoke arm 27, the journal 28 being tapped into the arm. The arm 27 is provided with a recess 29 receiving the ball bearing designated generally by the numeral 30, the outer end of the recess being closed by the disk 31 and the head 32 of the journal.

The section 21 of the cross arm is arranged in the bearing 33 which is threaded into the arm 12 of the yoke and provided with a suitable packing 34. The section 21 has a longitudinal passage 35 opening to the passage 11. It also has a lateral nipple 36 connected by the conduit 37 to the arm 38 opening to the spray pipe.

The spray head 39 illustrated is of double nozzle type and is provided with a valve not illustrated controlled by the rod 40 having threaded engagement at 41 with the coupling 42, the rod having a handle 43 which serves as a handle for manipulating the spray pipe. The nozzle head and valve structure may be that of the William L. Hamilton Patent No. 1,829,043, issued October 27, 1931.

With this arrangement, the spray pipe is in effect provided with a universal joint support and may be freely manipulated even when operating under heavy pressure, the back thrust of the pressure and the whipping action resulting from the manipulation of the sprayer all being mainly sustained by the supporting means.

We have illustrated and described the invention in highly practical embodiment thereof. We have not attempted to illustrate or describe certain modifications and adaptations which we contemplate as it is believed that this disclosure will enable those skilled in the art to embody or adapt the invention as may be desired.

Having thus described our invention, what we claim as new and desire to secure by Letters Patent, is:

1. A universal support and supply connection for an elongated spray pipe having a spray nozzle on one end thereof and a feed coupling and a spray directing and controlling handle on the other end thereof, said support comprising, a rigid looped carrying member having a passage formed in one side thereof, a tubular shank projecting from the bottom of said carrying member and communicating with said passage, a gland bearing threaded into said one side of said carrying member and communicating with said passage, a second bearing in the other arm of said carrying member and aligned with said first bearing, a two part cross bar having complementary half round clamp portions on the opposed ends of its parts and clampingly engaged with said spray pipe, one of said parts having a longitudinally bored outer end jornalled in said gland bearing and an angularly disposed coupling communicating with said bored end, the other of said parts being removably journalled in said other bearing, a connecting conduit removably connected between said angularly disposed coupling and said feed coupling, a swivel coupling connected to said tubular shank and having a supply connection, and a fixed support for said swivel coupling.

2. A universal support and supply connection for an elongated spray pipe having a spray nozzle on one end thereof and a feed coupling and a spray directing and controlling handle on the other end thereof, said support comprising, a rigid yoke carrying member having a passage formed in one side thereof, a tubular shank projecting from the bottom of said carrying member and communicating with said passage, a bearing in one side of said carrying member and communicating with said passage, a second bearing in the other arm of said carrying member and aligned with said first bearing, a two part cross bar having complementary half round clamp portions on the opposed ends of its parts and clampingly engaged with said spray pipe, one of said parts having a longitudinally bored outer end journalled in said first bearing and an angularly disposed coupling communicating with said bored end, the other of said parts being removably journalled in said other bearing, a connecting conduit removably connected between said angularly disposed coupling and said feed coupling, a swivel coupling connected to said tubular shank and having a supply connection, and a fixed support for said swivel coupling.

WILLIAM L. HAMILTON.
WILLIAM K. HAMILTON.

REFERENCES CITED

The following references are of record in the file of this patent:

UNITED STATES PATENTS

| Number | Name | Date |
| --- | --- | --- |
| 616,200 | Newcomb | Dec. 20, 1898 |
| 965,709 | Hart | July 26, 1910 |
| 1,432,958 | Boyce | Oct. 24, 1922 |
| 1,511,361 | Paasche | Oct. 14, 1924 |
| 1,728,455 | Taylor et al. | Sept. 17, 1929 |
| 1,744,157 | Browne | Jan. 21, 1930 |
| 1,829,043 | Hamilton | Oct. 27, 1931 |
| 1,848,436 | Shaw | Mar. 8, 1932 |
| 2,067,044 | Corley | Jan. 5, 1937 |
| 2,199,110 | Metz | Apr. 30, 1940 |